United States Patent
Hayashi et al.

(10) Patent No.: US 8,822,873 B2
(45) Date of Patent: Sep. 2, 2014

(54) METHOD FOR MANUFACTURING HONEYCOMB STRUCTURE FORMING DIE

(75) Inventors: Seiichiro Hayashi, Nagoya (JP); Tomoki Nagae, Nagoya (JP); Masanari Iwade, Nagoya (JP); Hirofumi Hosokawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 583 days.

(21) Appl. No.: 13/048,255

(22) Filed: Mar. 15, 2011

(65) Prior Publication Data

US 2011/0233171 A1 Sep. 29, 2011

(30) Foreign Application Priority Data

Mar. 23, 2010 (JP) ................. 2010-065887

(51) Int. Cl.
| | |
|---|---|
| B23H 5/00 | (2006.01) |
| B23H 9/00 | (2006.01) |
| B23K 9/00 | (2006.01) |
| B23H 1/08 | (2006.01) |
| B23H 1/10 | (2006.01) |
| B23H 1/04 | (2006.01) |
| B23H 1/06 | (2006.01) |

(52) U.S. Cl.
USPC .................. 219/69.17; 219/69.14; 219/69.15

(58) Field of Classification Search
USPC ........... 219/78.11, 69.14, 69.15, 69.17, 69.2; 29/280, 558; 228/161, 174, 173; 425/190, 192 R, 380, 461, 467
See application file for complete search history.

(56) References Cited

U.S. PATENT DOCUMENTS

| | | | |
|---|---|---|---|
| 5,630,951 A * | 5/1997 | Peters ........................ | 219/69.12 |
| 6,290,837 B1 | 9/2001 | Iwata et al. | |
| 6,570,119 B2 | 5/2003 | Marcher | |
| 2005/0076627 A1 | 4/2005 | Itou et al. | |
| 2005/0198822 A1* | 9/2005 | Hironaga et al. ............... | 29/890 |
| 2010/0044910 A1* | 2/2010 | Kurakake et al. ........ | 264/177.12 |

FOREIGN PATENT DOCUMENTS

| | | |
|---|---|---|
| JP | 63-028522 A1 | 2/1988 |
| JP | 63-028523 A1 | 2/1988 |
| JP | 2002-273626 A1 | 9/2002 |
| JP | 2003-071638 A1 | 3/2003 |
| JP | 2004-000896 A1 | 1/2004 |
| JP | 2005-254345 A1 | 9/2005 |

OTHER PUBLICATIONS

Japanese Office Action dated Apr. 24, 2012.
Extended European Search Report (Application No. 11250319.8) dated Dec. 17, 2013.

* cited by examiner

*Primary Examiner* — Henry Yuen
*Assistant Examiner* — Michael Hoang
(74) *Attorney, Agent, or Firm* — Burr & Brown, PLLC

(57) ABSTRACT

A method for manufacturing a honeycomb structure forming die including a liquid groove forming step for forming linear processing liquid grooves whose width is smaller than that of the slit, in positions for forming the slits that form the partition walls of the honeycomb structure by subjecting the kneaded clay to extrusion in one side end face as a kneaded clay forming face of a plate-shaped die substrate. An introduction hole forming step for forming introduction holes for introducing the kneaded clay is performed before or after the liquid groove forming step. Slits communicating with the introduction holes are formed by performing comb-like electro-discharge machining by a comb-like electrode where plate-shaped protrusion electrodes, each corresponding to the width of the slit, are disposed in positions including the processing liquid grooves.

2 Claims, 6 Drawing Sheets

METHOD FOR MANUFACTURING HONEYCOMB STRUCTURE FORMING DIE

BACKGROUND OF THE INVENTION

1. Field of the Invention

The present invention relates to a method for manufacturing a honeycomb structure forming die for extrusion-forming a honeycomb structure having cells having different sizes.

2. Description of Related Art

There is increasing the need for removing particulate matter and harmful substances in exhaust gas from internal combustion engines, boilers, and the like in consideration of influences to an environment. In particular, regulations regarding the removal of Particulate matter (hereinbelow sometimes referred to as "PM") discharged from diesel engines tend to be strengthened on a global basis, and the use of a honeycomb filter is attracting attention as a trapping filter (hereinbelow sometimes referred to as "DPF") for removing PM. Therefore, various systems have been proposed. In the aforementioned DPF generally has a structure where a plurality of cells having a cross sectional shape of a quadrangle, hexagon, or the like and functioning as fluid passages are formed by porous partition walls and where the porous partition walls constituting the cells play a role of a filter. Here, the "cross sectional shape" means the shape of a cross section taken along a plane perpendicular to the longitudinal direction of the cells.

In the DPF, a target fluid to be treated, which contains particulate matter, is allowed to flow in the DPF from one side end portion, and, after the particulate matter is filtrated by the partition walls, purified gas is discharged from the other side end portion. There is a problem that, as the exhaust gas flows in the DPF, the particulate matter contained in the exhaust gas deposits in the one side end portion (exhaust gas inflow side end portion) to clog a cell. This is prone to be caused in the case that a large amount of particulate matter is contained in the exhaust gas or in a cold district. When a cell is thus clogged, there arises a problem that the pressure loss in the DPF is rapidly increased. In order to suppress such clogging of a cell, there has been proposed a structure (HAC (High Ash Capacity) structure) where the cross-sectional area of the cells (inflow side cells) open in the end portion on the exhaust gas inflow side is different from that of the cells (outflow side cells) open in the other side end portion (end portion on the exhaust gas outflow side) (see, e.g., JP-A-2004-896). Here, the cross-sectional area means the area of a cross section taken along a plane perpendicular to the longitudinal direction of the cell. By increasing the size (area) of the cell opening portion (cell cross section) of the inflow side cells than that of the outflow side cells, the surface area of the inflow side cell surface where particulate matter and the like deposit becomes large, which enables to suppress the increase of pressure loss.

As a method for manufacturing a ceramic honeycomb structure, there has conventionally been known a method using a honeycomb structure forming die (hereinbelow sometimes referred to as a "die") provided with back holes (hereinbelow sometimes referred to as an "introduction holes") for introducing a forming raw material (hereinbelow sometimes referred to as "kneaded clay") and a die substrate where slits having a hexagonal shape or the like and communicating with the back holes are formed. The forming raw material such as a ceramic raw material introduced in the die from the back holes moves to the slits having narrow width from the back holes having relatively large inner diameter and is extruded as a formed article having a honeycomb structure (honeycomb formed article) from the opening portions of the slits.

As a method for manufacturing such a honeycomb structure forming die, there has been known a grinding method in the case of quadrangular cells. In addition, as a method for manufacturing a hexagonal cell honeycomb structure forming die, for example, there is disclosed a manufacturing method where the aforementioned honeycomb shaped slits are formed by electro-discharge machining (EDM) (see, e.g., Japanese Patent No. 1784822, Japanese Patent No. 1784823, and JP-A-2002-273626). As a method for forming slits in a hexagonal cell die, there is disclosed a method where each side of the cell is worked by a rib electrode of carbon or the like (see JP-A-63-28522). In addition, in order to stably perform slit machining by duplicating discharge, there is disclosed a method where holes for allowing a processing liquid to flow therethrough in positions corresponding with back holes are made before slit machining (JP-A-2005-254345).

However, in a honeycomb structure having different cell sizes between the target fluid inflow side and the outflow side, since cells having different cell sizes are aligned, the partition walls are not linearly formed. Therefore, the slits for forming partition walls of the honeycomb structure in the honeycomb structure forming die for extrusion-forming a forming raw material are disposed not linearly but in a concavo-convex shape. Therefore, it is impossible to form the slits in the honeycomb structure forming die having such a structure by grinding as in the die for extrusion-forming a honeycomb structure of quadrangular cells.

Therefore, in order to form slits corresponding with the cell structure having different cell sizes between the target fluid inflow side and the outflow side, a die has been manufactured by electro-discharge machining using an electrode having a mesh shape which is like a transcription of a cell structure of the slits. However, since many steps are required for manufacturing a mesh-shaped electrode and a DPF has a large diameter, time of several months to half year is required for manufacturing an electrode for manufacturing a die.

Also, a HAC die of a DPF has the following problem. Since the DPF has a large rib thickness, the slit width of the die is wide, the machining removal amount is increased, and the number of steps is increased. Since a sludge generation amount is increased according to the increase in the processing removal amount, in a method where liquid holes are formed and where a processing liquid is allowed to flow through the liquid holes (see JP-A-2005-254345), machining removal is difficult because the flow rate of the processing liquid is not sufficient. This causes deterioration in processing stability and accuracy of slit width/depth of the slits. In addition, since the liquid holes are formed with a laser or a drill, processing stability of the slits deteriorates by the influences of dross and burr. Therefore, there has been demanded a method for more easily manufacturing a die for extrusion-forming a honeycomb structure having different cell sizes between the target fluid inflow side and the outflow side.

SUMMARY OF THE INVENTION

The present invention aims to provide a method for manufacturing a honeycomb structure forming die, the method enables to more easily manufacture a die for extrusion-forming a honeycomb structure having cells having different sizes.

The present inventors found out that the aforementioned problems can be solved by manufacturing a die by electro-discharge machining using a comb-like electrode with forming processing liquid grooves and allowing the processing liquid to flow through the grooves. That is, according to the present invention, there is provided the following method for manufacturing a honeycomb structure forming die.

According to a first aspect of the present invention, a method for manufacturing a honeycomb structure forming die for subjecting kneaded clay as a raw material to extrusion forming in order to manufacture a honeycomb structure provided with porous partition walls separating and forming a plurality of cells functioning as fluid passages and having first cells having a predetermined opening area and second cells having a different opening area from that of the first cells disposed alternately, wherein the method comprises: a liquid groove forming step for forming linear processing liquid grooves whose width is smaller than that of a slit, in positions for forming the slits for forming the partition walls of the honeycomb structure by subjecting the kneaded clay to extrusion in one side end face as a kneaded clay forming face of a plate-shaped die substrate having the one side end face and the other side end face, an introduction hole forming step for forming a plurality of introduction holes for introducing the kneaded clay, the introduction holes communicating with the processing liquid grooves, in the other side end face to function as a kneaded clay introduction face of the die substrate before or after the liquid groove forming step, and a slit forming step for forming slits communicating with the introduction holes by performing comb-like electro-discharge machining with a comb-like electrode where a plurality of plate-shaped protrusion electrodes corresponding with the slit width are disposed in positions including the processing liquid grooves on the one side end face as the kneaded clay forming face of the die substrate.

According to a second aspect of the present invention, the method for manufacturing a honeycomb structure forming die according to the first aspect is provided, wherein the slit forming step is performed with allowing the processing liquid to circulate in the processing liquid grooves after the introduction hole forming step and the liquid groove forming step.

According to a third aspect of the present invention, the method for manufacturing a honeycomb structure forming die according to the first or second aspect is provided, wherein the slits are formed by inserting the comb-like electrode in positions deviated from the central axes of the processing liquid grooves in the slit forming step.

In a method for manufacturing a honeycomb structure forming die of the present invention, since a die is formed with forming processing liquid grooves and allowing the processing liquid to flow though the grooves, the processing stability of a die for extrusion-forming a honeycomb structure having cells having different sizes can be improved, and the die can be manufactured more easily.

REFERENCE NUMERALS

Figure 1:
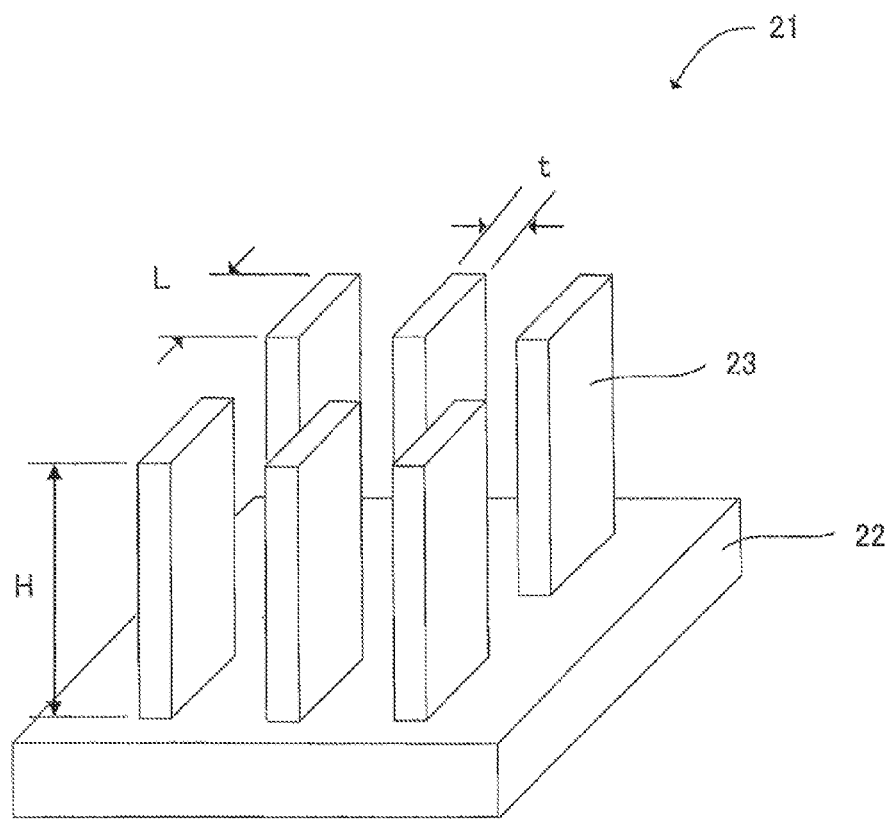
FIG. 1 is a perspective view schematically showing a part of a comb-like electrode.

1: honeycomb structure forming die, 2: die substrate, 3: processing liquid groove, 3$j$: central axis (of liquid groove), 4: introduction hole, 5: slit, 7: one side end face, 8: the other side end face, 10: processing liquid, 17: kneaded clay formation face, 18: kneaded clay introduction face, 21: comb-like electrode, 22: comb-like electrode support portion, 23: protrusion electrode, 40: honeycomb structure, 41: partition wall, 42: cell

DETAILED DESCRIPTION OF THE INVENTION

Hereinbelow, an embodiment of the present invention will be described with reference to the drawings. The present invention is by no means limited to the following embodiment, and changes, modifications, and improvements may be made as long as they do not deviate from the scope of the present invention.

A method for manufacturing a honeycomb structure forming die (hereinbelow sometimes referred to simply as a die 1) of the present invention is a method for manufacturing a honeycomb structure forming die for subjecting kneaded clay as a raw material to extrusion forming in order to manufacture (form) a honeycomb structure 40 (see FIG. 5) provided with porous partition walls 41 separating and forming a plurality of cells 42 functioning as fluid passages and having first cells having a predetermined opening area and second cells having a different opening area from that of the first cells disposed alternately. The honeycomb structure 40 manufactured by a die 1 manufactured by a method for manufacturing a honeycomb structure forming die of the present invention can be used as, for example, a honeycomb filter where the first cells are open on the one side end portions and plugged on the other side end portions and the second cells are plugged on the one side end portions and open on the other side end portions to allow the fluid flowing in from the one side end portions where the first cells are open to pass through the partition walls 41, to be discharged into the second cells as a permeated fluid, and to be discharged from the other side end portions where the second cells are open.

A method for manufacturing a honeycomb structure forming die of the present invention has a liquid groove forming step for forming linear processing liquid grooves 3 whose width is smaller than that of the slits 5 in positions for forming the slits 5 for forming the partition walls 41 of the honeycomb structure 40 by subjecting the kneaded clay to extrusion in one side end face 7 as a kneaded clay forming face 17 of a plate-shaped die substrate 2 having the one side end face 7 and the other side end face 8, an introduction hole forming step for forming a plurality of introduction holes 4 for introducing the kneaded clay, the introduction holes 4 communicating with the processing liquid grooves 3, in the other side end face 8 to function as a kneaded clay introduction face 18 of the die substrate 2 before or after the liquid groove forming step, and a slit forming step for forming slits 5 communicating with the introduction holes 4 by performing comb-like electro-discharge machining by a comb-like electrode 21 (see FIG. 1) where a plurality of plate-shaped protrusion electrodes 23 corresponding with the slit 5 width are disposed in positions including the processing liquid grooves 3 on the one side end face 7 to function as the kneaded clay forming face 17 of the die substrate 2.

In the die 1 for forming a honeycomb structure 40 having cells 42 having different sizes, since the slits 5 for forming partition walls 41 are not linear, a mesh electrode has conventionally been used, and manufacturing of the electrode took time, which caused rise in costs. A manufacturing method of the present invention is a method using a comb-like electrode 21 as shown in FIG. 1. In the comb-like electrode 21, a plurality of plate-shaped protrusion electrodes 23 corresponding with groove width of the die 1 are disposed on the plate-shaped comb-like electrode support portion 22. Since the comb-like electrode 21 can be worked not by discharge, but by cutting or grinding, time spent for manufacturing can be reduced, and the production costs can be reduced. In addition, in a conventional mesh electrode, since it is difficult to manufacture an electrode with high accuracy, the accuracy in slit width of the die is low. However, the comb-like electrode 21 used for a manufacturing method of the present invention has a simple structure, and working with high accuracy is possible. That is, since the comb-like electrode 21 enables to manufacture a die with high accuracy in a short period of time, a manufacturing method of the present invention using the comb-like electrode 21 enables to reduce production costs.

Since a method for manufacturing a honeycomb structure forming die of the present invention has the liquid groove forming step where linear processing liquid grooves 3 are formed, a sufficient processing liquid 10 can be circulated in the slit forming step. By performing the slit forming step with allowing the processing liquid 10 to circulate in the processing liquid grooves 3, it is possible to discharge sludge generated by the electro-discharge machining on the surface side of the die substrate 2, normal electro-discharge machining can be realized by causing stable discharge by a comb-like electrode 21, and a honeycomb structure forming die 1 can be manufactured with high precision.

In a method for manufacturing a honeycomb structure forming die, after predetermined slits 5 are formed by a comb-like electrode 21 in the slit forming step, the comb-like electrode 21 is rotated on the one side end face 7 to form the next predetermined slits 5. In the honeycomb structure 40 having cells 42 having different sizes, neither the partition walls 41 nor the slits 5 of the die 1 for forming is linear. Therefore, by forming the slits 5 with rotating the comb-like electrode 21, the slits which are not linear of the die 1 can be formed.

In a method for manufacturing a honeycomb structure forming die, two or more kinds of comb-like electrodes 21 are used or the positions of the electrodes of the same kind are shifted from each other for processing in the slit forming step. In order to manufacture the die 1 for forming a honeycomb structure 42 having cells 42 having different sizes, it is necessary to use two or more kinds of comb-like electrodes 21 or to shift the positions of the electrodes of the same kind.

The embodiment of the present invention will be described in more detail. In the first place, the material for constituting the die substrate 2 of the honeycomb structure forming die 1 will be described.

(Material Constituting Die Substrate)

As the material for constituting the die substrate 2 to be used in the present embodiment, metal or alloy generally used as a material for a honeycomb structure forming die may be employed. For example, there may be employed a metal or an alloy containing at least one metal selected from the group consisting of iron (Fe), titanium (Ti), nickel (Ni), copper (Cu), and aluminum (Al). Incidentally, it is more preferable that the metal or alloy constituting the first plate-shaped member 23 contains additives such as carbon (C), silicon (Si), chrome (Cr), manganese (Mn), molybdenum (Mo), platinum (Pt), and palladium (Pd).

As another suitable example of the alloy constituting the die substrate 2, there may be employed stainless steel alloy, more specifically, SUS630 (C: 0.07 or less, Si: 1.00 or less, Mn: 1.00 or less, P: 0.40 or less, S: 0.030 or less, Ni: 3.00 to 5.00, Cr: 15.50 to 17.50, Cu: 3.00 to 5.00, Nb+Ta: 0.15 to 0.45, Fe: the rest (the unit is mass %)). Such stainless steel alloy can be worked relatively easily and is inexpensive.

In addition, as another example of the alloy for constituting the die substrate 2, it is preferable to use an alloy constituted of a tungsten carbide group superhard alloy excellent in abrasion resistance. This enables to manufacture a honeycomb structure forming die 1 where abrasion of the slits 5 is effectively inhibited.

The aforementioned tungsten carbide group superhard alloy is an alloy containing at least tungsten carbide and is preferably an alloy obtained by sintering tungsten carbide with at least one metal selected from the group consisting of iron (Fe), cobalt (Co), nickel (Ni), titanium (Ti), and chrome (Cr). A tungsten carbide group superhard alloy using at least one metal selected from the aforementioned group as a bonding material is particularly excellent in abrasion resistance and mechanical strength. A specific example is a tungsten carbide group superhard alloy using cobalt (Co) as the bonding material at a WC—Co ratio of 0.1 to 50 mass %.

By employing a plate-shaped member of the aforementioned material as the die substrate 2, a honeycomb structure forming die 1 can be manufactured by the following steps.

(Liquid Groove Forming Step)

Figure 2A:
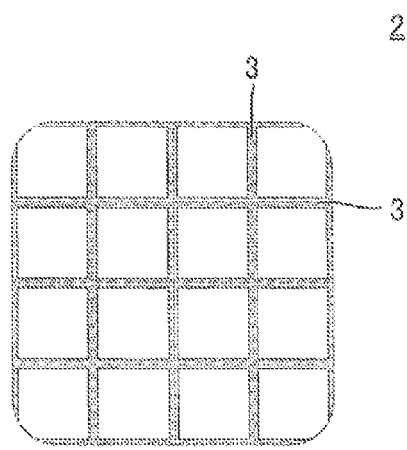
FIG. 2A is a plan view of a die substrate where processing liquid grooves are formed.
Figure 2B:
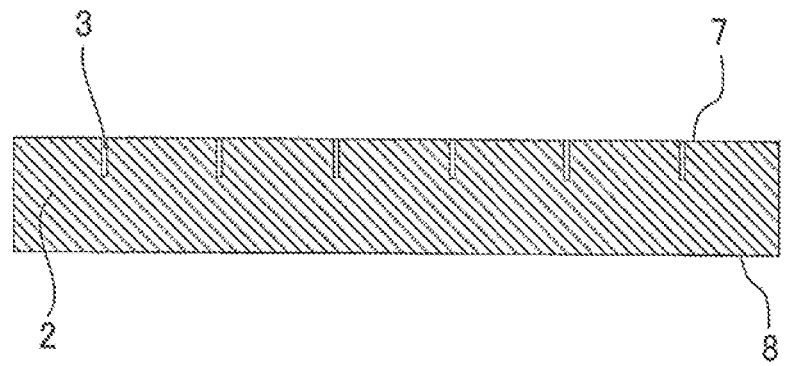
FIG. 2B is a cross-sectional view of a die substrate where processing liquid grooves are formed.

The liquid groove forming step will be described by the use of FIGS. 2A to 2B. FIG. 2A shows a plan view of a die substrate 2, and FIG. 2B shows a cross-sectional view of a die substrate 2. In the first place, as shown in FIG. 2A, in the one side end face 7 of the die substrate 2 where slits 5 are planned to be formed, linear processing liquid grooves 3 whose width is smaller than that of the slits 5 are formed. The processing liquid grooves 3 are formed in a mesh shape having the same vertical and horizontal interval as linear grooves. The depth is determined so that the grooves communicate with the introduction holes 4 when the introduction holes 4 are made from the other side end face 8 side in a latter step. As the working method, grinding is preferable from the viewpoints of capability of response to a large diameter size, high accuracy, and high efficiency. Alternatively, another method capable of linear working (wire electro-discharge machining, cutting, etc.) may be employed. The liquid groove width is preferably 0.025 to 0.800 mm, more preferably 0.090 to 0.400 mm.

(Introduction Hole Forming Method)

Figure 3A:
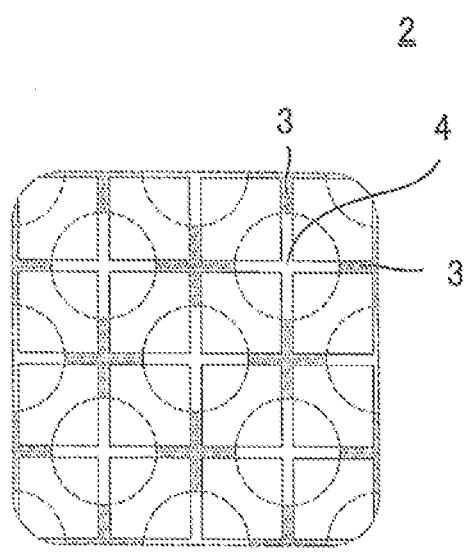
FIG. 3A is a plan view of a die substrate where introduction holes are formed.
Figure 3B:
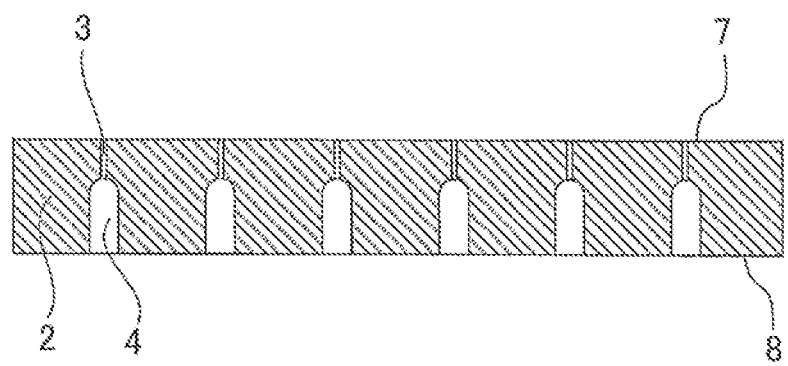
FIG. 3B is a cross-sectional view of a die substrate where introduction holes are formed.
Figure 3C:
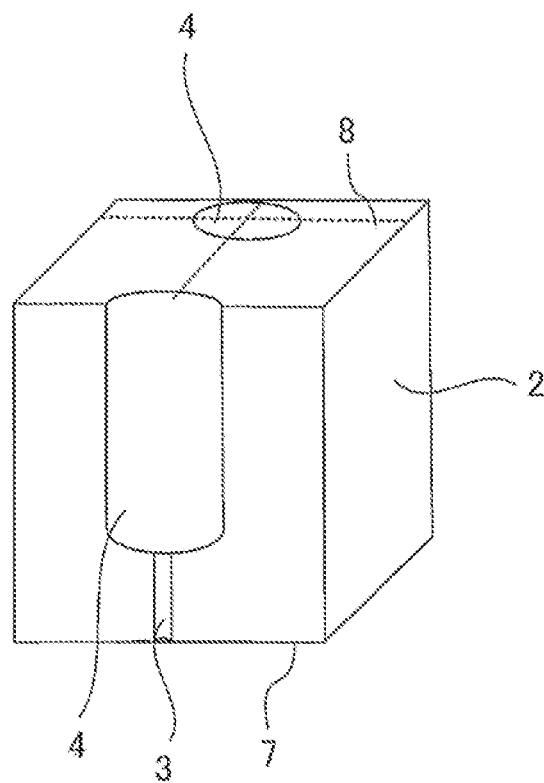
FIG. 3C is a partial cross-sectional perspective view of a die substrate where introduction holes are formed.

The introduction hole forming method will be described by the use of FIGS. 3A to 3B. FIG. 3A shows a plan view of a die substrate 2 viewed from the one side end face 7 of the die substrate 2 where the slits 5 are planned to be formed, FIG. 3B shows a cross-sectional view of the die substrate 2, and FIG. 3C shows a perspective view of a die substrate 2. In the first place, as shown in FIGS. 3A to 3C, introduction holes 4 open in the thickness direction in the other side end face 8 to function as a kneaded clay introduction face 18 of the die substrate 2 are formed. In addition, upon forming the introduction holes 4 in the die substrate 2, as shown in FIG. 3A, it is preferable to form the holes 4 in positions where the holes 4 communicate with the intersection portions of the processing liquid grooves 3 of the honeycomb structure forming die 1. By forming the introduction holes 4 in such positions, upon the extrusion forming using the honeycomb structure forming die 1, the forming raw material introduced into the introduction holes 4 can be spread uniformly in the entire slits 5 to be able to realize high moldability.

The size of the opening diameter of the introduction holes 4 can be determined appropriately according to the size of the honeycomb structure forming die 1 to be manufactured, the shape of the honeycomb structure 40 (see FIG. 5) to be extrusion-formed, and the like. There is no particular limitation on the method for forming such introduction holes 4, and a conventionally known method by electrochemical machining (ECM), electro-discharge machining (EDM), laser machining, or mechanical working such as drilling can suitably be employed.

(Slit Forming Step)

The slits 5 formed in the slit forming step are honeycomb-shaped slits 5 for extrusion-forming the honeycomb structure 40 having cells 42 having different sizes. The width of the slits 5 is, for example, 0.05 to 1.00 mm. The depth of the slits 5 from the kneaded clay formation face 17 is for example 0.50 to 5.00 mm.

(Comb-Like Electrode)

In the slit forming step, comb-like electro-discharge machining is performed plural times on the kneaded clay formation face 17 by the use of a comb-like electrode 21 as shown in FIG. 1 where parallelly-arranged plate-shaped protrusion electrodes 23 corresponding with one side of the slit 5 are arranged in parallel on the protrusion electrode support portion 22.

In the protrusion electrodes 23 provided on the comb-like electrode 21, the thickness t is allowed to correspond with the width of the slits 5 and is, for example, 0.020 to 0.800 mm. In addition, the height H of the protrusion electrodes 23 is larger than the depth of the slits 5 and is, for example, 1.00 to 8.00 mm. In addition, the width L of the protrusion electrode 23 is, for example, 0.40 to 2.00 mm.

Incidentally, when the slits 5 are deep, it is preferable to perform machining by the comb-like electrode 21 plural times. The reason is because the slits may have a tapered shape where the slit width becomes narrower as the slits 5 become deeper due to wastage of the electrode. In order to widen the slits in the deep portion, it is preferable that, after comb-like electro-discharge machining is performed, the comb-like electrode 21 is replaced by a new one to perform electro-discharge machining with the new comb-like electrode 21 plural times. In addition, it is preferable to use the protrusion electrodes 23 whose thickness t is reduced in the repeated comb-like electro-discharge machining because only the deep portions of the slits 5 having a tapered slit width can be machined without being machined in the portions near the upper face of the machining face.

(Material Constituting Comb-Like Electrode)

Though there is no particular limitation on the material constituting the comb-like electrode 21 used in the present embodiment, a carbon graphite microparticle material having high strength and high density can be employed. More specifically, a preferable example has an average particle diameter of 5 μm or less. A carbon electrode of such a carbon graphite material has the advantages of being able to form an article having a minute shape such as the protrusion electrodes 23 of the comb-like electrode 21, having high hardness and excellent abrasion resistance, and having high machining speed. However, since it is prone to, be damaged because of high hardness, when a carbon graphite microparticle material having high strength and high density is used as a material constituting the comb-like electrode 21, it is particularly preferable to previously remove a machining region by performing coarse slit machining or the like and to efficiently remove sludge generated during the electro-discharge machining by a processing liquid or the like.

Figure 4A:
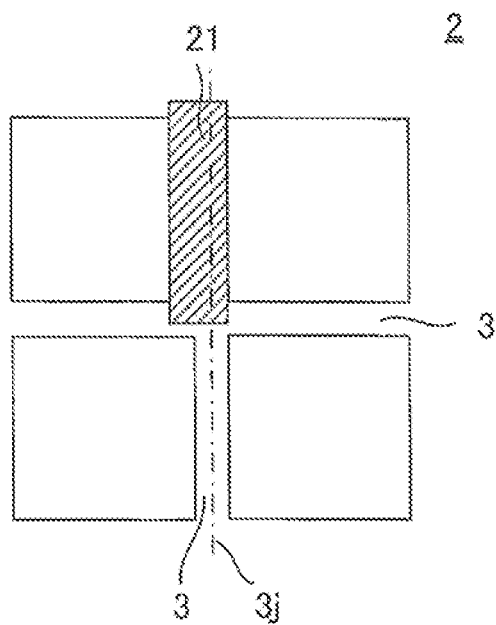
FIG. 4A is a plan view of a die substrate showing a step of forming a slit.

The slit forming step will be described by the use of FIGS. 4A to 4E. FIG. 4A is a plan view of a die substrate 2 for explaining slit formation by the comb-like electrode 21, FIG. 4B is a perspective view, FIG. 4C is a plan view of the die substrate 2 for explaining slit formation by the comb-like electrode 21, following FIG. 4A, FIG. 4D is a plan view of a die 1 manufactured in the slit forming step, and FIG. 4E is a cross-sectional view of the die 1 shown in FIG. 4D.

Two or more kinds of comb-like electrodes 21 are used as necessary and rotated on the kneaded clay formation face 17 to machine the die substrate 2.

Figure 4B:
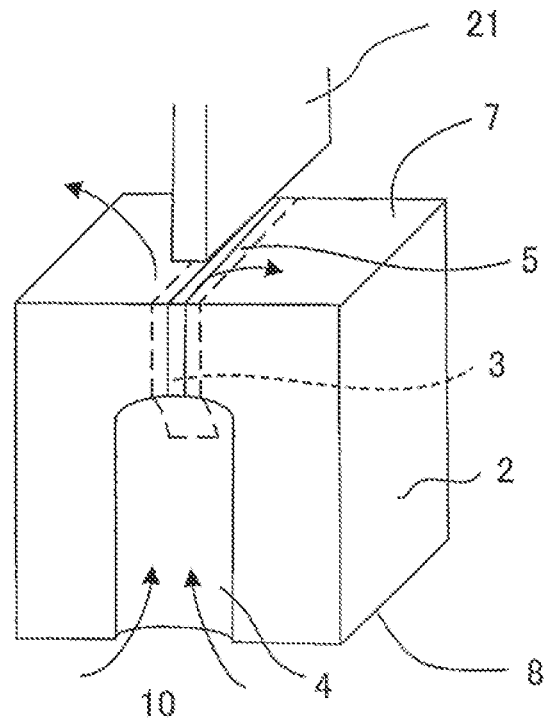
FIG. 4B is a partial cross-sectional perspective view of a die substrate showing a step of forming a slit.

As shown in FIGS. 4A and 4B, comb-like electro-discharge machining is performed in positions included the processing liquid grooves 3 by the comb-like electrode 21 (see FIG. 1) where a plurality of plate-shaped protrusion electrodes 23 corresponding with groove width of the slits 5 are disposed to form slits 5 communicating with the introduction holes 4. Incidentally, in this case, as shown in FIG. 4B, by allowing the processing liquid 10 to circulate in the processing liquid grooves 3 from the introduction holes 4, stable machining can be obtained. The direction of the processing liquid 10 may be from the hole side to the slit side as in the figure or may be the reverse. In addition, in order to manufacture a die for forming a honeycomb structure 40 having cells 42 having different sizes, the protrusion electrodes 23 of the comb-like electrode 21 are inserted into the positions deviating from the central axes 3j of the processing liquid grooves 3. This enables to manufacture a die 1 for producing cells 42 having different sizes.

Figure 4C:
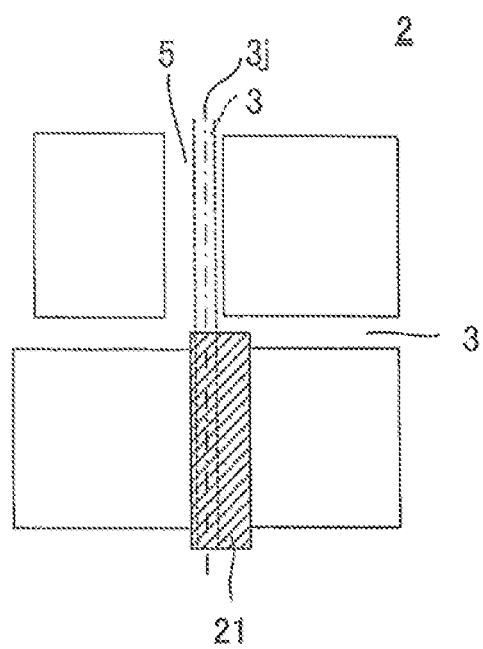
FIG. 4C is a plan view of a die substrate showing a step of forming a slit, following FIG. 4A.
Figure 4D:
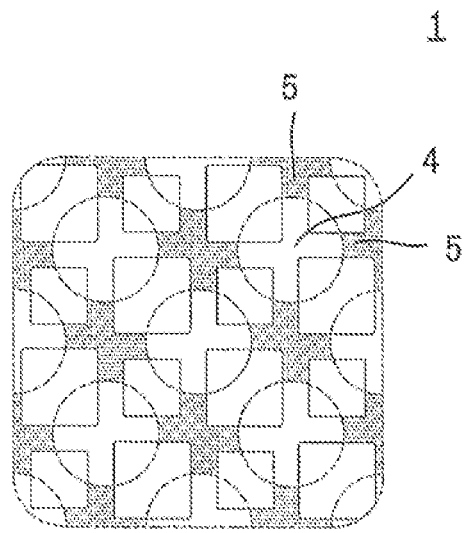
FIG. 4D is a plan view of a die where slits are formed.
Figure 4E:
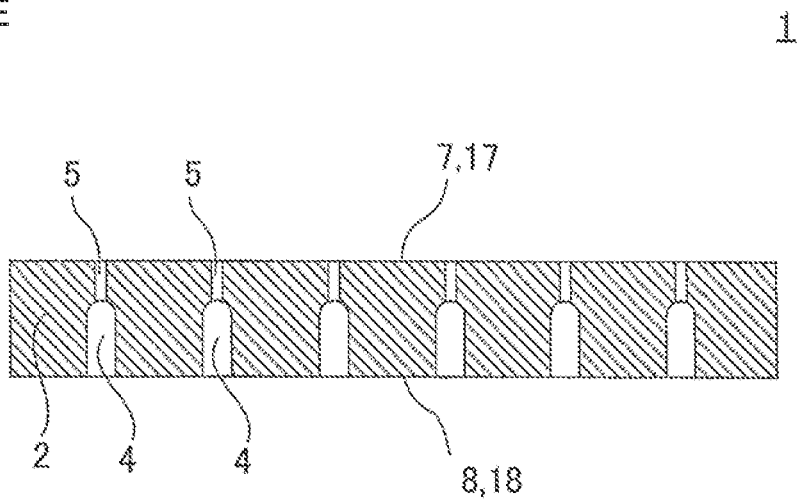
FIG. 4E is a cross-sectional view of a die where slits are formed.
Figure 5:
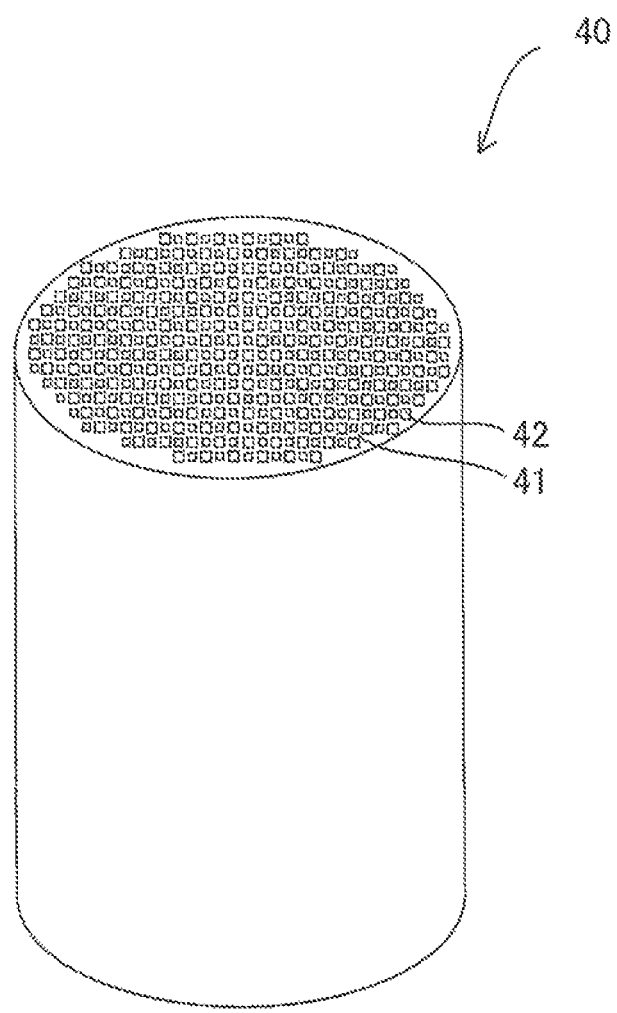
FIG. 5 is a perspective view showing an embodiment of a honeycomb structure manufactured by a die manufactured by a method for manufacturing a honeycomb structure forming die of the present invention.

Following FIG. 4A, as shown in FIG. 4C, the protrusion electrodes 23 of the comb-like electrode 21 are inserted in the positions deviating from the central axes 3j of the processing liquid grooves 3 in a different direction from that of the FIG. 4A in the same line and different stage of the FIG. 4A. By thus inserting the comb-like electrode 21 so as to deviate in alternately different directions from the central axes 3j of the processing liquid grooves 3, there can be manufactured a die 1 for manufacturing a honeycomb structure 40 having large cells and small cells alternately formed therein as shown in FIGS. 4D and 4E. By the extrusion forming using the die 1, a honeycomb structure 40 as shown in FIG. 5 can be manufactured.

EXAMPLE

Hereinbelow, the present invention will be described in more detail on the basis of Examples. However, the present invention is by no means limited to these Examples.

Example

In the processing liquid groove forming step, there were formed, as shown in FIGS. 2A and 2B, processing linear liquid grooves 3 having a width of 0.18 mm, which is smaller than that of the slits 5, on the one side end face 7 of the die substrate 2 where slits 5 are planned to be formed of the stainless steel plate-shaped die substrate 2 having vertical and horizontal sizes of 180×180 mm and a thickness of 20 mm.

Next, in the introduction hole forming step, about 10 thousands of introduction holes 4 having an opening diameter of 1.4 mm was formed in the other side end face 8 of the die substrate 2 as shown in FIGS. 3A to 3C in positions corresponding with vertexes of the cells 42 of the honeycomb structure 40 to be obtained by extrusion forming up to the depth of 17.5 mm from the kneaded clay introduction face 18.

Next, comb-like electro-discharge machining was performed as shown in FIGS. 4A to 4C. Specifically, the plate-shaped protrusion electrodes 23 provided on the comb-like electrode 21 had a thickness t of 0.2 mm, a height H of 4.50 mm, and a width L of 1.5 mm in a direction parallel to the protrusion electrodes 23. With discharging processing liquid 10 to the one side end face 7 side via the introduction holes 4 from the other side end face 8 of the die substrate 2, comb-like electro-discharge machining was performed by the use of a comb-like electrode 21 to obtain a die 1 as shown in FIGS. 4D and 4E.

Comparative Example

As Comparative Example, a die was manufactured without forming any liquid groove by grinding. The other steps were the same as in Example.

Results

By the processing liquid grooves 3, the removal amount was reduced by 33% in advance, and the discharge machining time could be reduced by 33%. The number of steps even including the number of steps for machining processing liquid grooves 3 was reduced by 10%. The flow rate of the processing liquid was increased by the processing liquid grooves 3, sludge discharge performance was improved, and the rib electrode breakage generated upon slit electro-discharge machining was reduced by 50%. In the liquid holes, in the case of drilling or laser machining, breakage of a rib electrode was caused by a burr or the like at the time of starting slit electro-discharge machining. However, in the processing liquid grooves 3 machined by grinding, which has very little generation of burrs, there was no breakage.

The method can be used as a method for manufacturing a honeycomb structure forming die for extrusion-forming a honeycomb structure having cells having different sizes.

What is claimed is:

1. A method for manufacturing a honeycomb structure forming die for subjecting kneaded clay as a raw material to extrusion forming in order to manufacture a honeycomb structure provided with porous partition walls separating and forming a plurality of cells functioning as fluid passages and having first cells having a predetermined opening area and second cells having a different opening area from that of the first cells disposed alternately, wherein the method comprises:
   a liquid groove forming step for forming linear processing liquid grooves having a width that is smaller than a width of a slit-forming plate-shaped protrusion electrode, in positions for forming slits which form the partition walls of the honeycomb structure by subjecting the kneaded clay to extrusion in one side end face as a kneaded clay forming face of a plate-shaped die substrate having the one side end face and another side end face,
   an introduction hole forming step for forming a plurality of introduction holes for introducing the kneaded clay, the introduction holes communicating with the processing liquid grooves, in the another side end face to function as a kneaded clay introduction face of the die substrate before or after the liquid groove forming step, and
   a slit forming step for forming slits communicating with the introduction holes by performing comb-like electro-discharge machining by a comb-like electrode where a plurality of plate-shaped protrusion electrodes, each corresponding to the width of the slit, are disposed in positions including the processing liquid grooves on the one side end face as the kneaded clay forming face of the die substrate,
   wherein during the slit forming step the slits are formed by inserting the comb-like electrode in positions deviated from central axes of the processing liquid grooves.

2. The method for manufacturing a honeycomb structure forming die according to claim 1, the slit forming step is performed while allowing the processing liquid to circulate in the processing liquid grooves after the introduction hole forming step and the liquid groove forming step.

* * * * *